3,275,616
MODIFIED POLYOLEFINS
John E. Hammond, Rochester, N.Y., assignor to National Distillers and Chemical Corporation, New York, N.Y., a corporation of Virginia
No Drawing. Filed Apr. 19, 1963, Ser. No. 274,352
9 Claims. (Cl. 260—94.9)

The present invention relates generally to improved thermoplastic sheeting and films, and more specifically to new fogging resistant wrapping materials which are specially adapted to wrapping moisture-containing and moisture-emitting products such as fresh meats, poultry, fresh vegetables, and the like, and particularly for wrapping products which are subjected to refrigeration while so packaged. It is especially adapted for making such packaging materials from thermoplastic polymers of ethylene or propylene.

It has become wide-spread commercial practice in the merchandising of freshly cut meats and other produce to wrap individual items such as cuts of meat in films of transparent plastic material. The thus-wrapped products are visible through the packaging material and can be displayed, for example, in a refrigerated counter.

The characteristics of the wrapping material are quite important for this type of application. The package should be attractive and the inner surface of the plastic wrapping material must be resistant to fogging under conditions of refrigeration and during changes of temperature. Additionally, the package wrapping should transmit oxygen at a sufficient rate when used to encase freshly cut red meats such that the red color or so-called bloom of the meat is preserved. The film must also be capable of being readily and tightly sealed, preferably by heat, to substantially prevent leakage of moisture and juices contained in the completed package.

Since many polyolefin films inherently possess properties of high permeability to oxygen, low water permeability, and excellent low temperature sealability, transparent polyolefin film or sheeting offers a good material for use as a base in such packaging.

However, transparent wrapping materials, such as thermoplastic polyolefin films, possess the undesirable property of fogging when exposed to moisture emitting products. This is due to the condensation of moisture, in the form of tiny droplets, particularly on the side of the film exposed to the moisture containing product. In particular, it has been noticed that such condition occurs more noticeably when the wrapped, moisture containing products are subjected to temperature changes such as refrigeration after having been packaged.

Attempts have been made in the past to reduce this fogging tendency by applying hydrophilic coatings to the surface of the film which tend to overcome the natural hydrophobic characteristics of the film surface and causing the condensed moisture to wet-out on the film surface, thereby eliminating individual droplet formations and attendant fogging. However, such coatings usually detract from the optical properties of the film such as gloss and haze and necessitate costly coating process steps. A further disadvantage of these coatings is the attendant loss of oxygen permeability of the coated film. This decreased oxygen permeability tends to cause packaged products such as meat to discolor and lose its natural bloom.

It is an object of the present invention to produce uncoated thermoplastic films which are resistant to fogging caused by moisture.

It is also an object of the present invention to provide a method for making fogging resistant thermoplastic wrapping material which exhibits improved optical properties.

It is a further object of the present invention to produce fogging resistant thermoplastic wrapping materials which possess increased oxygen permeability.

It is still another object of the present invention to produce a fogging resistant thermoplastic wrapping material which exhibits improved adhesiveness to inks, coatings, labels and other thermoplastics.

The accomplishment of these and other objectives of the present invention will be understood by the following detailed description.

It has been discovered that a homogeneous blend of an N-acyl sarcosine surfactant at low concentation with a polyolefin resin may be used to produce products with improved and unexpected properties compared to products produced from the same unmodified resin. Thus, packaging films from such compositions exhibit improved optical properties such as lower haze, higher gloss, and increased transmittance. Additionally, these films possess anti-fogging properties, without a coating of an additional material, for the packaging of moisture containing foods. They exhibit increased permeability to oxygen, which is important for providing bloom to fresh meat. These films further exhibit increased adhesion for printing ink, coatings, labels, and other plastics.

In carrying out the process of this invention, the N-acyl sarcosine surfactant is mixed with the polyolefin resin to obtain a thorough distribution of the surfactant throughout the polyolefin resin.

The addition of the N-acyl sarcosine can be accomplished in any convenient manner so long as there is attained a thorough distribution of the surfactant throughout the polyolefin. For example, the components can be mixed together in a ribbon blender, a Hobart mixer, paddle blender, and the like.

It is preferred to conduct the total mixing, or at least a portion of it, at a temperature sufficiently high to flux the components in order to produce a blend of better uniformity and greater homogeneity. The hot mixing can be satisfactorily carried out in a Banbury mixer, on a two-roll mill, in a compounding extruder or other such apparatus. Also, a portion of the mixing sequence can be combined with the shaping or forming operation as, for example, by accomplishing the final mixing in the barrel of the forming extruder. Also, the hot mixing and thorough blending of components can be accomplished by a masterbatch technique whereby the N-acyl sarcosine is blended with the polyolefin resin at a higher concentration than desired in the final fabricated product by using a Banbury mixer, two-roll mill, compounding extruder or other such apparatus, and then blending this composition thoroughly with additional polyolefin resin to the desired concentration of surfactant using a Banbury mixer, two-roll mill, compounding extruder, or other such apparatus. Alternatively, a dry blending apparatus may be used along with the shaping and forming equipment to accomplish the reduction to desired concentration. Such dry blending apparatus may be a ribbon mixer, cone blender, Hobart mixer, paddle blender, and the like.

Thus, in carrying out the process of this invention, an N-acyl sarcosine is thoroughly blended with a polyolefin resin, and if a portion of this blending does not consist of the shaping and forming process an additional subdivision process is carried out to obtain the blended resin in a form suitable for the shaping, forming, or fabrication process. Such a subdivision process may be granulation, extrusion and pelletization, milling to sheets followed by dicing, or other such process.

In carrying out this invention, antioxidant may be added as required to maintain resin stability and prevent degradation. This requirement of antioxidant will depend on the type of polyolefin resin employed, the characteristics of the resin, the amount of antioxidant present in the base polyolefin resin, the particular blending process employed, the shaping and forming process to be employed, and the specific application the finished product is prescribed to fulfill. Also, other additives may also be employed and added in the blending process to obtain the desired properties for the finished product. Thus, pigments, fillers, dyes, ultraviolet absorbers, slip agents, anti-blocking agents and the like may also be added.

An alternate method of thoroughly mixing the surfactant with the polyolefin resin is to carry out the blending as part of the polymerization process. Thus, the surfactant may be a catalyst carrier or a portion of a catalyst carrier, a polymerization modifier, a carrier for other additive employed during the polymerization, or other similar phase of the polymerization process.

The base polyolefin resin may be low density or medium density polyethylene as produced by the high pressure process, high density polyethylene as produced by the low pressure process, polypropylene, polybutene, or other polyolefin or copolymers of these with another olefin, i.e. ethylene-propylene copolymers, or blends of two or more of these resins. Also copolymers of these olefin monomers with other vinyl monomers, i.e. ethyl acrylate, methyl acrylate, methyl methacrylate, vinyl acetate, etc., or blends of olefin polymer with olefin copolymers or vinyl monomer polymer may be employed as the base polyolefin resin to prepare the N-acyl sarcosine surfactant modified compositions. The preferred base polyolefin resins are ones which have molecular weight and molecular characteristics which impart film forming properties so as to produce articles with toughness and flexibility as illustrated by polyethylene and polypropylene resins commercially used for producing film, molded items, fibers, and the like.

N-acyl sarcosine surfactants are high molecular weight carboxylic acids in which the hydrocarbon chain is interrupted by an amidomethyl group as represented by the formula:

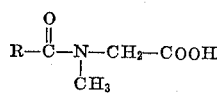

wherein R represents an alkane or an alkylene hydrocarbon radical which contains from about 8 to about 30 carbon atoms. This additive material may also be defined as a high molecular weight carboxylic acid in which the hydrocarbon chain is interrupted by an amidomethyl group. The acid may be a saturated acid, monoethenoid acid, diethenoid acid, triethenoid acid, or polyethenoid acid. The molecular weight range of such N-acyl sarcosines is defined by a range of from 12 to 34 carbon atoms. As a modifier for the polyolefin resin a pure N-acyl sarcosine or a mixture of N-acyl sarcosines may be employed.

These N-acyl sarcosine modifiers are exemplified by the group of surfactants called "Sarkosyl" as produced by Geigy Industrial Chemicals of Saw Mill River Road, Ardsley, New York. Specific examples of N-acyl sarcosine surfactants are:

| | $C_{10}$, Percent | $C_{12}$, Percent | $C_{14}$, Percent | $C_{16}$, Percent | $C_{18}$, Percent | Oleic, Percent | Unsat., Percent |
|---|---|---|---|---|---|---|---|
| Sarkosyl L | | 95 | 3 | 1 | | 1 | |
| Sarkosyl LC | 2 | 55 | 22 | | 21 | | |
| Sarkosyl O | | | 5 | 3 | | 80 | 12 |
| Sarkosyl S | | | | 50 | 49 | 1 | |

The preferred N-acyl sarcosine surfactant is Sarkosyl O. By class an N-acyl sarcosine surfactant of 14 to 22 carbon atoms and containing at least 50% N-oleyl sarcosine.

The ratio of N-acyl sarcosine surfactant to polyolefin resin may vary from .001 part to 3 parts by weight per 100 parts by weight of polyolefin resin. The preferred ratio will depend on the specific improvement desired but for optimum properties a concentration of 0.10 weight percent to 1.5 weight percent of surfactant based on the total composition weight is preferred. For improvement in optical properties even very low concentrations have an effect. For improvement in gas or vapor permeability the range preferred will depend on the permeability desired. To obtain a fabricated film with anti-fogging properties a concentration of 0.1 weight percent or greater is needed. In relation to increasing adhesion for ink, coatings, etc., this same range of concentration is desired.

The required temperature for thoroughly blending the surfactant with the resin will depend on the polyolefin resin employed and is usually the temperature recommended for fluxing the polymer, i.e. for low density polyethylene, 250°–300° F. However, a higher temperature may be employed if the blending is part of the fabrication process. Thus, the method of blending also will affect the blending temperature.

Fabrication conditions employed for the blended composition will be approximately the same as those recommended for the unmodified base polyolefin resin and thus will depend on the fabrication process, the base resin, the fabrication equipment, and to some extent on the properties desired in the fabricated product.

Film *haze* is determined by means of a standard pivotable sphere hazemeter in accordance with ASTM test method D1003–52. The method determines the light-transmitting properties and from these the wide-angle light-scattering properties of film samples. The percentage of light diffused by the sample, as measured by means of a photocell inside of the pivotable spherical photometer, is recorded. The lower the percentage, the less hazy the film tested.

ASTM test method D523–53T measures the specular *gloss* at 60°, that is, the luminous reflectance of the plane surface of polyethylene film or molded specimens at an angle from the perpendicular. A standard glossmeter with a light source and a photosensitive device or receptor for receiving and measuring the intensity of the pyramid of rays reflected by the specimen is used.

*Ink adhesion* is determined by the Scotch cellophane tape test whereby tape is firmly pressed onto the printed film surface and is then removed by a rapid pull. Ink adhesion is indicated by the amount of ink removed by the tape, i.e., 100% ink removed means no ink adhesion.

The *yield strength* is the highest tensile force or stress, in pounds per square inch of cross-sectional area of the test specimen, to which a plastic molded shape or film may be submitted and still return to its original shape when the pulling force is removed (ASTM test methods D638–58T and D882–56T).

The extension of the sample at the moment of rupture is called *elongation* and is expressed as a percentage of the original length of the measured elongating section (ASTM test methods D638–58T and D882–57T).

*Modulus of elasticity* is the ratio of stress (nominal) to corresponding strain below the proportional limit of a material. It is expressed in force per unit area (ASTM test method D638–61T).

*Anti-fogging* is measured as follows: A deep glass dish is partially filled with water. The film under test is stretched over the opening of the dish and wedged into place by partially inserting into the dish the bottom of a second dish. The film is cooled by placing ice into the upper dish. The material is permitted to stand in an air-conditioned laboratory. The film is satisfactory if the underside is fogged over an area of less than one half square inch after standing for forty five minutes.

*Oxygen permeability*, as referred to in this patent application, is measured by an isostatic method essentially the same as described by D. M. Davis, Paper Trade Journal 123 (9): 33–40 (1946); Raff and Allison, "Polyethylene," p. 216 ff. (1956).

In this method, multiple samples of film are mounted in a suitable apparatus so that oxygen gas, saturated with water vapor and essentially at atmospheric pressure, is circulated over one surface of each film while pure carbon dioxide, also saturated with water vapor and at the same pressure, is circulated over the opposite sides as a sweep gas. The effluent carbon dioxide is passed into a nitrometer containing a 50% aqueous solution of potassium hydroxide which absorbs the carbon dioxide and permits the transmitted oxygen to be collected and measured volumetrically. Knowing the total area of film exposed, the time period during which the sweep gases are collected in the nitrometer, and the thickness of the film samples used, one can calculate permeability in terms of standard units:

$$\frac{\text{cc.-mil}}{100 \text{ in.}^2\text{-24 hrs.-atmos.}}$$

*Rupture energy* is an expression of the energy required to break a film sample pulled in tension. It is measured by integrating the area beneath a stress-strain curve obtained by pulling a strip to the breaking point in a standard testing machine at a jaw separation rate of 10 inches per minute. The unit of measurement is:

$$\frac{\text{foot-pounds}}{\text{cubic inches}}$$

The integration step may be carried out by mechanically measuring the area on the actual stress-strain chart or by means of an electronic integrator built into the testing machine.

The following examples serve to illustrate specific embodiments of the present invention and are not to be construed in a limiting sense.

Example I

To obtain a thorough mixing of the N-acyl sarcosine with the polyolefin resin, a Stewart Bolling Model No. O Banbury type mixer of 6-pound capacity was employed. Five pounds of polyethylene having a melt index of 3.0 and density of 0.933 was mixed and heated until a homogeneous fluxing of the resin was obtained. Mixing was carried out with a rotor speed of 88 r.p.m., maintaining a blanket of nitrogen gas on the resin during mixing. At this point 0.05 pound of Sarkosyl O was added to the fluxing resin and the components were mixed for 15 minutes at a temperature of 300°–325° F. with an 88 r.p.m. rotor speed, maintaining a nitrogen blanket on the mixture. The blended components were partially cooled to approximately 250° F., discharged from the mixer, subdivided to a size suitable for granulation, and then cooled to room temperature. The cooled resin blend was then granulated to pellet size for extrusion.

This blended composition was then extruded to cast film using a 1″ MPM extruder with a 20/1 $L/D$ ratio. The three zones of the extruder were controlled at approximately 350°, 450°, and 500° F., respectively, and the Egan flat film die employed for extrusion was controlled at approximately 550° F. Screw speed was 40 r.p.m., take up rate was 20 feet per minute and the melt temperature was 249° C. A die setting of 15 mils was employed. One mil film of high transparency and gloss and good quality was collected for evaluation.

Using the same extrusion conditions and procedure, pellets of the same polyethylene resin (commercially known as Petrothene 218) were extruded into one-mil film for comparative evaluation. Also, pellets of the same resin were Banbury-mixed using the same conditions and procedure as employed in the preparation of the blend except that Sarkosyl-surfactant was not added. This Banbury-homogenized resin was then extruded to one-mil film by the same procedure.

Table A compares the properties of the three resin compositions.

TABLE A

| | Control Polyethylene Resin | Banburied Control Polyethylene Resin | Polyethylene-Sarkosyl O Composition |
|---|---|---|---|
| Haze (Percent) | 3.9 | 4.5 | 3.6 |
| Gloss (Percent) | 77.7 | 72.0 | 80.4 |
| Oxygen Permeability [1] | 270 | 260 | 430 |
| Anti-Fogging Test | [2] | [2] | [3] |
| Scotch Tape Ink Adhesion Test | [4] | [4] | [5] |
| Rupture Energy (Ft. Lbs./Cu. In.) | 290 | 280 | 240 |

[1] $\frac{\text{CC. (Mil)}}{\text{(Day) 100 Sq. In. (Atm.)}}$
[2] Failed.
[3] No Fogging.
[4] 100% Ink Removed.
[5] 50% Ink Removed.

The tabulated results of Example I clearly indicate the marked improvement in optical properties, oxygen permeability, anti-fogging properties, and ink adhesion provided by the incorporation of the N-acyl sarcosine surfactant. This improvement is accomplished without sacrifice of film strength or other properties associated with this polyethylene resin. These improvements provide a packaging film with increased utility for the packaging of fresh meat since oxygen permeability has been increased over 50% to insure rapid bloom of the meat cut. Also, the necessity of coating the surface of the film which contacts the meat with an anti-fogging coating has been eliminated. Also, the film may be printed or a label adhered to it with greater ease than with the standard unmodified or untreated film. Thus, a film of greater utility, greater customer appeal, and increased protection for perishable items has been provided by this invention.

*Example II*

Using the blending procedure of Example I, a polyethylene of 0.923 density and 2.65 melt index was blended with Sarkosyl O to yield a composition containing 1% by weight surfactant. This composition control film was likewise prepared from pellets of the same resin designated commercially as Petrothene 233. The comparative properties of the one mil films are tabulated in Table B.

TABLE B

|  | Control Polyethylene Resin | Polyethylene-Sarkosyl O Composition |
|---|---|---|
| Haze (percent) | 1.6 | 1.0 |
| Gloss (percent) | 83.2 | 88.5 |
| Oxygen Permeability [1] | 455 | 500 |
| Anti-Fogging Test | (2) | (3) |
| Scotch Tape Ink Adhesion Test | (4) | (5) |
| Rupture Energy (Ft. Lbs./Cu. In.): |  |  |
| MD [6] | 424 | 594 |
| TD | 213 | 625 |

[1] $\left( \dfrac{CC. (Mil)}{(Day)100 \ Sq. \ In. \ (Atm.)} \right)$.

[2] Fog Obscured, See through.
[3] No Fogging.
[4] 100% Ink Removed.
[5] 50% Ink Removed.
[6] MD = Machine Direction; TD = Transverse Direction.

The improvement in properties including strength is clearly indicated by the tabulated data. Thus, an improved packaging film for fresh meat and other oxygen-requiring perishable foods has been provided by the invention.

*Example III*

A crystalline polypropylene resin of 0.901 density and 3.60 grams per 10 minute melt index commercially known as Profax 6513 was mixed to a fluxing condition in the Stewart Bolling Model No. O Banbury type mixer. At this point 0.5% by weight of Sarkosyl O was added and, with a nitrogen gas blanket on the charge, mixing was continued for 15 minutes at 290–320° F. using an 88 r.p.m. rotor speed. The charge was partially cooled in the mixer, then removed and milled on a two roll mill to a sheet, and then cooled to room temperature. This composition was granulated and then extruded into 1-mil film.

For extrusion a 1' MPM extruder of 20/1 L/D ratio was employed with an 8" Egan flat film die with 1" land and set for 15 mil die gap. The heating zones of the extruder were controlled at approximately 360° F., 450° F., and 475° F., and the die was controlled at approximately 550° F. The casting rolls were controlled at 65° F. Take-up rate was 20 feet per minute. A polyethylene screw with 5 metering turns and a 4:1 compression ratio was employed, operating at a speed of 40 r.p.m. One-mil film of high transparency, gloss, low haze, and good quality was collected for evaluation.

Using the same Banburying conditions and extrusion conditions, pellets of the same resin were extruded into one-mil film for comparison. Also, pellets of the resin as supplied commercially were extruded into one-mil film for evaluation.

The data for the evaluation of these films are listed in Table C.

TABLE C

|  | Control Polypropylene Resin | Control Banburied Polypropylene Resin | Polypropylene-Sarkosyl O Composition |
|---|---|---|---|
| Haze (percent) | 3.2 | 3.5 | 1.2 |
| Gloss (percent) | 65.9 | 64.9 | 89.6 |
| Tensile Yield Strength (p.s.i.): |  |  |  |
| M.D.[1] | 3,100 | 2,960 | 3,130 |
| T.D. | 2,990 | 3,090 | 2,740 |
| Tensile Modulus (p.s.i.): |  |  |  |
| M.D. | 112,000 | 106,000 | 106,000 |
| T.D. | 109,000 | 113,000 | 101,000 |
| Elongation (percent): |  |  |  |
| M.D. | 590 | 620 | 570 |
| T.D. | 700 | 600 | 600 |
| Ink Adhesion | (2) | (2) | (3) |
| Anti-Fogging Properties | (4) | (4) | (5) |

[1] M.D.=Machine Direction; T.D.=Transverse Direction.
[2] 100% ink removed.
[3] 75% ink removed.
[4] Heavy fogging.
[5] Slight fogging.

The tabulated results of Example III clearly indicate the high increase in optical properties obtained without significant effect on film strength. Also, improved anti-fogging and ink adhesion properties are illustrated. Thus, packaging films of increased utility are provided by this invention.

*Example IV*

In a 25-lb. capacity Farrel-Birmingham Banbury, a polyethylene resin of 0.923 density and 2.65 melt index was blended with 1.0% by weight Sarkosyl O using a mixing temperature of 275° F. and a mixing cycle of 10 minutes. The hot-blended composition from the Banbury was sheeted on a two-roll mill and then cooled in a water bath. This material was diced and then dry blended in a cone blender to obtain resin compositions containing 0.50% by weight and 0.25% by weight surfactant.

These blended compositions were extruded to one-mil film using the equipment and procedure outlined in Example I. Also, using the mixing procedure outlined above and the extrusion procedure of Example I, the unmodified polyethylene resin known commercially as Petrothene 233 was prepared as one-mil film. The data are listed in Table D.

TABLE D

| | Control Banburied Polyethylene | Polyethylene-0.25% Sarkosyl O Composition | Polyethylene-0.50% Sarkosyl O Composition |
|---|---|---|---|
| Haze (percent) | 1.3 | 0.7 | 0.8 |
| Gloss (percent) | 86.9 | 89.8 | 93.8 |
| Oxygen Permeability [1] | 420 | 480 | 560 |
| Rupture Energy (ft. lbs./cu. In.): | | | |
| M.D.[2] | 424 | 349 | 325 |
| T.D. | 219 | 192 | 384 |
| Tensile Modulus (p.s.i.): | | | |
| M.D. | 19,800 | 19,700 | 19,300 |
| T.D. | 20,300 | 20,400 | 20,700 |
| Anti-Fogging Properties | [3] | [4] | [5] |
| Ink Adhesion Test | [6] | [7] | [8] |

[1] $\dfrac{CC.(Mil)}{(Day) 100 Sq. In. (Atm.)}$
[2] M.D.=Machine Direction; T.D.=Transverse Direction.
[3] Heavy fogging.
[4] Slight fogging.
[5] No fogging.
[6] 100% ink removed.
[7] 75% ink removed.
[8] 60% ink removed.

The tabulated data of Table D clearly illustrate the improvement in optical properties, oxygen permeability, anti-fogging properties, and ink adhesion obtained without a significant change in film strength or film stiffness. Thus, properties very important for polyolefin packaging films are improved by this invention to provide films of increased utility.

While this invention has been disclosed and illustrated by the above examples, it will be understood that the invention is obviously subject to other modifications and variations without departing from its broader aspects.

What is claimed is:

1. A polyolefin film-forming composition comprising a polyolefin having incorporated therein at least .001 percent by weight of an N-acyl sarcosine additive represented by the formula:

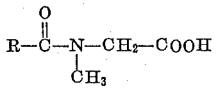

wherein R is a member selected from the group consisting of alkane and alkylene hydrocarbon radicals containing from about 8 to about 30 carbon atoms.

2. The film-forming composition of claim 1 wherein said N-acyl additive consists of a mixture comprising at least 50% N-oleyl sarcosine in admixture with other N-acyl sarcosines containing about 14 to about 22 carbon atoms.

3. The film-forming composition of claim 1 wherein said N-acyl sarcosine comprises from about 0.1 to about 1.5 percent by weight of said film-forming composition.

4. The film-forming composition of claim 1 wherein said polyolefin is polyethylene.

5. The film-forming composition of claim 1 wherein said polyolefin is polypropylene.

6. A method for the preparation of a fogging-resistant polyolefin film composition which comprises forming a homogeneous blend of a polyolefin and at least 0.001 percent by weight of an N-acyl sarcosine and extruding said homogeneous blend into a film.

7. The method of claim 6 wherein said polyolefin is polyethylene.

8. The method of claim 6 wherein said polyolefin is polypropylene.

9. The method of claim 6 wherein said N-acyl sarcosine is present in said homogeneous blend in a percent by weight range of from about 0.1 to about 1.5.

References Cited by the Examiner

UNITED STATES PATENTS 3,145,111   8/1964   Norton _____ 260—31.2

JOSEPH L. SCHOFER, *Primary Examiner.*

JAMES A. SEIDLECK, *Examiner.*

L. EDELMAN, *Assistant Examiner.*